Figure 1:
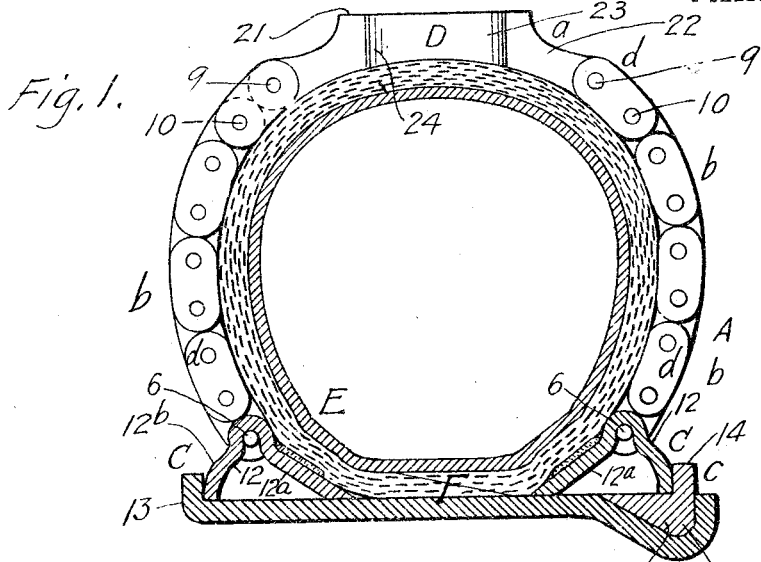

A. W. SAVAGE.
VEHICLE TIRE.
APPLICATION FILED JUNE 21, 1911.

1,075,993.

Patented Oct. 14, 1913.

2 SHEETS—SHEET 1.

Witnesses

Inventor,
Arthur W. Savage
by Beckett Blackdale,
his Attorneys.

A. W. SAVAGE.
VEHICLE TIRE.
APPLICATION FILED JUNE 21, 1911.
1,075,993.
Patented Oct. 14, 1913.
2 SHEETS—SHEET 2.
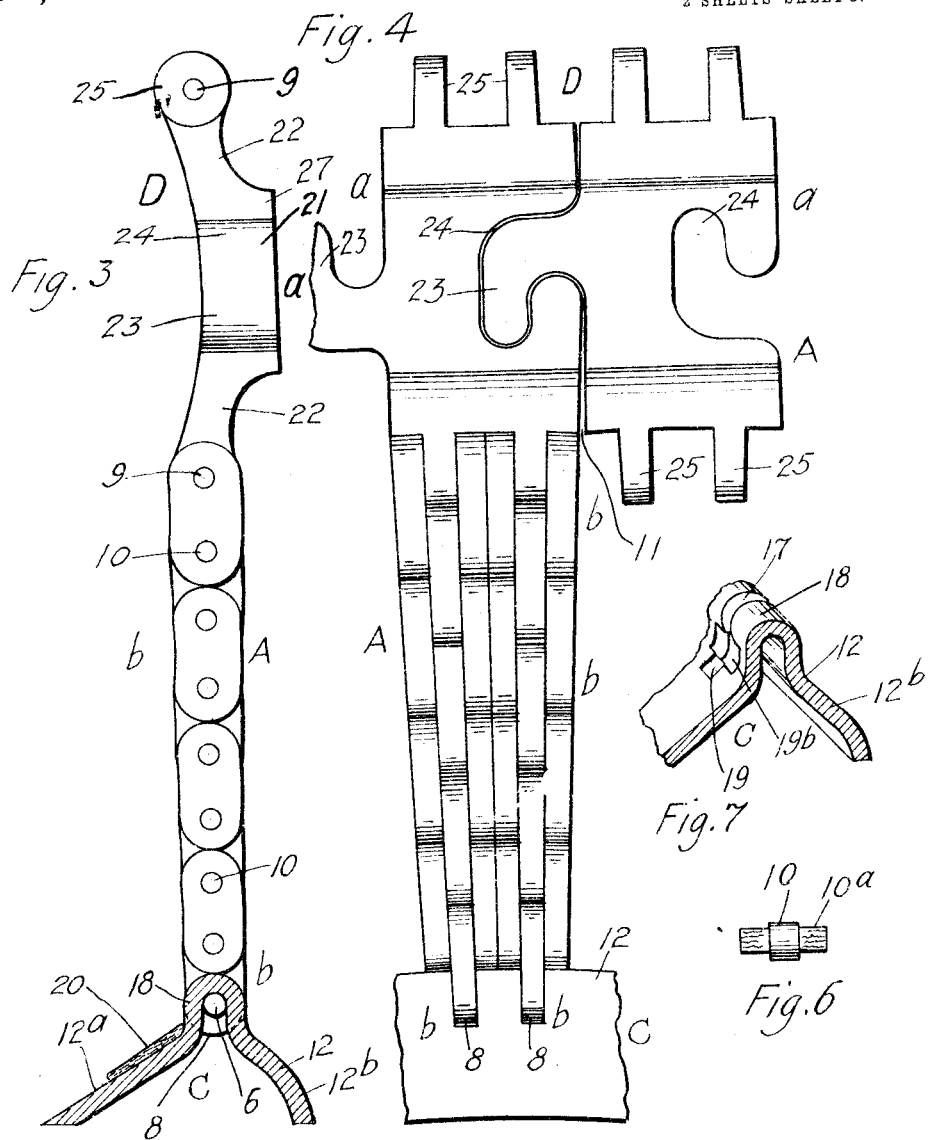
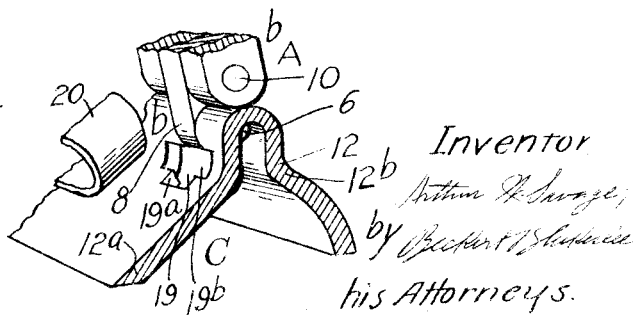
Witnesses
Inventor
his Attorneys.

UNITED STATES PATENT OFFICE.

ARTHUR W. SAVAGE, OF DUARTE, CALIFORNIA.

VEHICLE-TIRE.

1,075,993.

Specification of Letters Patent.    Patented Oct. 14, 1913.

Application filed June 21, 1911. Serial No. 634,559.

*To all whom it may concern:*

Be it known that I, ARTHUR W. SAVAGE, a citizen of the United States, residing at Duarte, in the county of Los Angeles and State of California, have invented new and useful Improvements in Vehicle-Tires, of which the following is a specification.

This invention relates to vehicle tires, and more particularly to tires for automobiles and motor vehicles; and it has for its object to provide an improved vehicle tire which will be superior in point of relative inexpensiveness of construction, durability, length of life, and facility in assembling and taking apart, and which will be approximately devoid of liability to puncture or blow-out, and which will effectively resist the tendency to skid or slip, by the use of which a more efficient traction may be obtained, and which will be generally superior in efficiency and serviceability.

The invention constitutes an improvement upon or advance in certain directions with relation to, or certain departures from, that invention disclosed in an application for Letters Patent filed by me Feb. 13, 1911, Serial No. 608,349, for vehicle tires; and in the main, the invention comprises in preferred embodiment, a plurality of articulated sections the ends of which are detachably connected with the wheel, all of the sections being interrelated and serially united, so as to provide a substantially continuous entirety within which, or between which and the wheel, is inclosed and incased the pneumatic tube which supplies the resilience and cushion for the tire.

The invention consists in the novel and highly advantageous construction, organization, formation and combination and assemblage of parts, members and features, all as hereinafter described, shown in the drawings, and finally pointed out in claims.

Figure 2:
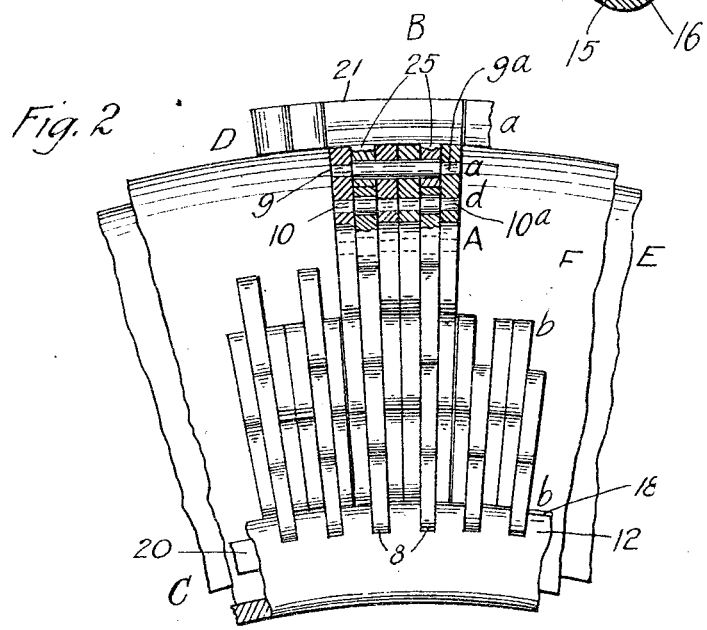

In the drawings:—Figure 1 is a transverse sectional view of a tire, and a portion of a wheel with which the tire is connected, all organized in accordance with the invention, and partly illustrated in elevation; Fig. 2 is a side elevation, partly fragmentary and broken away and partly in section, of the construction shown in Fig. 1; Fig. 3 is an enlarged side elevation, partly in section, and fragmentary, of one of the sections shown in the other figures and of securing means whereby the same is connected with the wheel; Fig. 4 is a view similar to Fig. 2, but taken in a line of vision at right angles to that of Fig. 3, part of a second section also being shown; Fig. 5 is an enlarged detail fragmentary view of a portion of the securing means and one of the sections connected therewith shown in the other figures; Fig. 6 is a face view of a pintle entering into the organization of the tire sections shown in the other figures; and, Fig. 7 is a perspective view similar to Fig. 5, parts being omitted.

Corresponding parts in all the figures are denoted by the same reference characters.

Referring with particularity to the drawings, A designates in each instance one of the tire sections, B designates the felly of a wheel with which the tire sections are connected by securing means C at both sides of the felly, said securing means being provided with locking means *c* whereby the securing means are held in operative positions; and D designates interlocking means or operative connections between the several sections A, through the agency of which the several sections are combined in unitary continuous tire formation, there being however narrow spaces normally between adjacent sections, and the interlocking means D permitting play as between and among the several sections in all directions, so that the sections may relatively approach and separate and move inwardly and outwardly toward the center of the wheel, in their jointed parts, as the tire traverses the roadway and is compressed under traction. The central portion of each section constitutes a tread portion. From this tread portion, at each side, extends a plurality of section parts or links *b*, and the terminal parts *b* are provided with connection heads 6 formed for engagement with the securing means C; said connection heads project oppositely and laterally from such terminal parts or links, which are provided with extensions 8 for permitting a proper working relation between the heads and the connection means. There are preferably a plurality of series of links or parts *b* extending between each tread portion, *a*, at each side of the same, and the securing means C at the respective side of the wheel, and two of the end links *b* are preferably provided with the connection heads 6, and the extensions 8, such links being spaced apart as shown in Figs. 2 and 4. But it is to be understood that I do not limit myself to the number of series of links

*b* connected with each tread portion, as shown. The several section parts or portions or links *a* and *b* are joined by hinge means *d*, whereby two or more of the series of links, and the links of each series, may be connected together in hinge relation. The hinge means comprise pintles, of which two forms, 9 and 10, are shown in the drawings. Within and surrounded by the sections A and the felly B, is the pneumatic tube E, a flexible covering or sheath F being interposed between the tube and the sections A as a protection against frictional disruption of the tube. The slight spaces between the adjacent sections are designated at 11.

The general organization and combination of the parts and features will be evident from the drawings and the above recital of the same, and I will now particularly disclose the specific features of construction and formation entering into the embodiment of the invention as shown in the drawings.

The securing means C comprise endless hoops or rings 12, substantially of inverted trough shape, which are disposed at the sides of the felly B, in contact with a side flange 13 thereon and a flange 14 upon a locking wedge 15 cotituting the locking means *c*, the same abutting against one of the rings 12 and fitting within a pocket 16 in the felly B, at one side thereof. All of this latter construction and formation may follow standard detachable tire practice. The rings 12 are, however, provided with a plurality of spaced slots 17, formed in the apices of the rings, which rings have upwardly rounded crowns 18 forming such apices. The inner side portion of each ring 12, that is the side 12ª of the ring, as distinguished from the the side 12ᵇ which abuts against the flange 13 or the flange 14, as the case may be, said sides being divergent from the common crown 18, is provided with a slot 19, directly beneath and entering the crown 18, and communicating with the slot 17 extending through and across the crown. The slot 19 is formed to just admit the lower rounded end of the respective extension 8, and also to admit the connection heads 6 upon the same. Each such slot 19 to that end has a lower contracted portion 19ª and an upper enlarged portion 19ᵇ. The lower end of the extension 8 may thus be passed into the slot 17, and the connection heads 6 may enter the space within the crown 18, between the sides 12ª and 12ᵇ of the respective ring 12, which crown 18 is rounded at its under side, and the top of which crown 18 is rounded to agree with the rounded formation of the lower or outer end of the extension 8. The extension 8 may thus swing upon the extension heads 6 as bearings, such extension heads working within the respective crown 18, as above set forth. To keep the extensions and connection heads in position in assemblage with the crown 18 of the respective ring 12, I employ a detachable seal 20 which may consist of a flexible adhesive tape pasted to the side 12ª of the ring, over the slots 19. This seal is useful in assembling the parts of the tire, prior to inflating the pneumatic tube E.

In the construction shown, the tread portions *a* are relatively larger than the portions or links *b*, and the curvature thereof is of an arc which fits it to the transverse curvature of the pneumatic tube at the portion thereof directly within the tread portion, where there is a flattening effect, due to compression of the tire. Each tread portion *a* also preferably has a slight exterior curvature, at both its inward and outward surfaces, in the plane of the circumference of the wheel. Each of said tread portions is provided with an outwardly projecting body 21, of increased thickness with relation to the end portions 22 of each such tread portion *a*; and at one side the same is provided with a laterally directed locking head 23, the opposite side of the same being provided with a locking recess 24, formed to receive a similar locking head 23 upon the next adjacent section A, locking heads 23 upon adjacent sections being directed laterally in opposite directions; and the dimensions of such locking heads and recesses permitting a slight relative play between the connected parts, in all directions, the recesses 24 extending completely through the tread portions. The co-acting heads 23 and recesses 24 constitute the interlocking means or operative connections D. The interlocking relations of the heads 23 and recesses 24, above recited, permit slight relative play between adjacent sections A in their entirety, causing diminution or enlargement of the spaces 11 between the sections, in the traction of the wheel. The general conformation of the heads 23 and the walls of the recesses 24 includes curvatures complementary as between the heads and recesses, both heads and recesses permitting a perfect working interlocking fit between parts.

The tread portions *a* as shown are provided each at each end with two spaced heads or hinge members 25 with which the series of links or parts *b* are connected by the pintles 9. In the form and arrangement of parts shown, three series of links or parts *b* are connected with each of the heads 25, the links or parts in the several series being in staggered relation, and having rounded end portions closely abutting against each other. Each group of three series has the links or parts therein connected together by the pintles 10, excepting the two inner end parts which are connected with the respective heads 25 by the pintle 9. Thus all these series of links b are connected with the two heads 25 by the pintle 9, and the links or parts of each three side series are connected together in one system or relation by the pintles 10. Each of the pintles 9 and 10 has diminished end portions, 9ᵃ and 10ᵃ respectively, which take into the outermost links or parts b connected by the same, such diminished portions being roughened to be seated in openings in such outermost links or parts, under compression, the relatively larger central portions acting as bearing surfaces in connection with accommodating openings in the other links or parts as well as in the heads 25 upon the tread section. The links or parts b vary slightly in thickness, so as to taper between the tread portions and the rings 12; and each of such links or parts taper slightly in length from the end portion nearest to the tread portion, to the opposite end portion, and is slightly curved longitudinally to fit the general curvature of the entire tire in cross section. The ends of the pintles 9 and 10 co-engage, and are of relatively harder material than that of the links or parts b, so as to act as fenders between the groups of series or parts b.

The protective sheath F is of suitable compressible or textile material.

The operation, method of use and advantages of improvements in vehicle tires above set forth will be readily understood from the foregoing description, taken in connection with the accompanying drawings and the following statement:—The protective sheath F is wrapped around the pneumatic tube E, and both are disposed around the felly B of the wheel. The several sections A are then disposed about the tube and sheath, and connected with the felly by the securing means C including the locking c. Each of the sections A is connected by its end links or parts c with the endless rings 12 of the securing means C, by the connection heads 6 upon the extension 8 of the two spaced links b of the respective groups of three of the series each which in toto constitute, at each side of the tread portion a, together with said tread portion, a given section. The connection heads are passed through the enlarged portions 19ᵇ of the slots 19, and the extensions 8 pass through the smaller portions 19ᵃ of said slots, and finally into the slots 17 in the crowns 18, the connection heads being accommodated by the rounded inner surfaces of the crowns 18. The rounded extensions 18 fill up the slots 17, so as to prevent the entrance of dust or other foreign materials into the working parts within the crowns 18. The slots 19 are closed by contact of the sheath F with the inner sides 12ᵃ of the rings 12, and also by the detachable seals 20, if the same are permitted to remain upon the sides 12ᵃ after the assemblage of the securing heads in connection with the crowns, such seals 20 maintaining such assemblage as it progresses around the rings. The flanges 13 and 14, upon the felly and upon the locking wedge 15 respectively, fit against the sides 12ᵇ of the rings 12, holding the rings, the tire sections A and the inclosed pneumatic tube and sheath, firmly, to the felly, the tube and sheath being inclosed or surrounded by the felly and the tire sections, in a substantially continuous formation, together with the rings 12, there being play permitted between the sections A in entirety, in all directions, by the cause of the slight spaces 11 between the sections and the slight enlargement of the recesses 24 with respect to the heads 23. The pneumatic tube and sheath are thus effectively protected from puncture or blow-out, but the resilient quality of the pneumatic tube is not interfered with, such tube being permitted to yield resiliently, as the wheel traverses the roadway, and the sections A including the tread portions thereof moving relatively in all directions, and within the same range throughout the series of such sections, as the resilience of the pneumatic tube is utilized or brought into play. As shown, the links or portions b of the sections A are narrow or of lesser dimension transversely of each section than they are radially of the wheel, and the length of each exceeds either other dimension. The inner side edges of the outer links b of each section are rounded so as to prevent abrasion or injury of the sheath, and all of the links, because of the longitudinal curvature of each, closely fit the tire and the sheath in the operative formation of the same, as shown in Fig. 1. The links b also taper in both transverse dimensions, from the tread portions toward the rings 12, so as to accommodate the sections to the diminished radius of the tire, from the tread portions of the same toward the felly of the wheel, and also to provide the most durable and strong construction toward the tread portions. The pintles 9 and 10 firmly hold the links together and to the tread portions a, the diminished end portions 9ᵃ and 10ᵃ thereof being seated under pressure in the openings in the outer links with which they are connected, and being roughened, causing a firm holding between the links and the pintles. The relatively larger central portions of such pintles work in bearing holes in the intermediate links, permitting the proper hinge play as among the links.

It will be noted that the inner sides 12ᵃ of the rings 12 supplement the felly B in forming an effective seat for the tire and the sheath and oppose no abruptly angled or rounded portions to the latter, thus minimizing the danger of wear and abrasion and consequent blow-out. The rings fill completely the spaces between the holding flanges 13 and 14, and the felly, and the tire and sheath, keeping out any foreign substances and preventing injury at those points.

The interlocking heads 23 and recesses 24 constitute positive operative connections between the several sections A, and the tread portions *a* thereof, maintaining a substantially continuous formation throughout the tire, while permitting the relative play above referred to, as between the sections. The hook formation or lateral projection of the heads 23, alternately in opposite extension, produces a positive and stress-resisting relation among all the sections.

I do not desire to be understood as limiting myself to the specific provision, construction, formation, combination, and relative arrangement of parts, members and features, as shown and described; but reserve the right to vary the same, in adapting the improvements to varying conditions of use, without departing from the spirit of the invention and the terms of the following claims.

Having thus described my invention, I claim and desire to secure by Letters Patent:—

1. A vehicle tire, comprising a plurality of sections, and means for securing each of the sections in connection with the vehicle wheel; said means comprising slotted annuli upon the wheel, said annuli having spaced side portions, and means upon the sections fitting the spaces between the side portions of the annuli and formed to traverse said slotted portions; and adjustable seals covering said slotted portions of said annuli.

2. A vehicle tire, comprising a plurality of sections, and means for detachably securing each of the sections in connection with the vehicle wheel, said means comprising slotted annuli upon the wheel and having divergent side portions, and connection heads formed for engagement with the annuli between the divergent side portions thereof; said divergent side portions being adapted to rest upon the felly of the wheel with certain of said side portions forming with the felly a pneumatic tube seat, and holding means abutting against the other side portions of the annuli.

3. A vehicle tire, comprising a plurality of separate sections, and securing means for connecting the same with a wheel of the vehicle, each of the sections being provided with a tread portion, and interlocking means between and detachably connecting adjacent tread portions; said interlocking means comprising laterally directed hook-shaped heads and recesses receiving the same.

4. A vehicle tire, comprising a plurality of separate sections, and securing means for detachably connecting the same with a wheel of the vehicle, each of the sections being provided with a tread portion, and interlocking means between and detachably connecting adjacent tread portions; said interlocking means comprising laterally directed hook-shaped heads and recesses receiving the same, said hook-shaped heads being alternately directed oppositely throughout the continuous series of tread portions.

In testimony whereof, I have signed my name to this specification in the presence of two subscribing witnesses.

ARTHUR W. SAVAGE.

Witnesses:
  RAYMOND I. BLAKESLEE,
  C. P. WARDEN.